United States Patent [19]

Boucher

[11] 4,405,652

[45] Sep. 20, 1983

[54] PREPARATION OF WINE HAVING A LOW CALORIE CONTENT AND A REDUCED ALCOHOL CONTENT

[75] Inventor: Armand R. Boucher, Stamford, Conn.

[73] Assignee: Joseph E. Seagram & Sons, Inc., New York, N.Y.

[21] Appl. No.: 341,363

[22] Filed: Jan. 21, 1982

[51] Int. Cl.$^3$ .................. C12G 1/00; C12G 3/08; C12G 3/12

[52] U.S. Cl. ............................ 426/494; 99/277; 426/14; 426/15; 426/592; 426/493

[58] Field of Search ............... 426/492, 493, 494, 14, 426/15, 592; 203/89; 99/277, 277.1

[56] References Cited

U.S. PATENT DOCUMENTS

| | | | |
|---|---|---|---|
| 1,800,940 | 4/1931 | Heuser | 426/493 X |
| 2,734,023 | 2/1956 | Hickman | 203/89 X |
| 3,052,546 | 9/1962 | Riddell et al. | 426/15 |
| 3,200,050 | 8/1965 | Hogan et al. | 203/89 X |

OTHER PUBLICATIONS

Amerine, M. A., Wine Production Technology in The United States, ACS Symposium Series 145, American Chem. Soc., Washington, D.C., 1981, (pp. 69-70).

*Primary Examiner*—David M. Naff
*Attorney, Agent, or Firm*—Kane, Dalsimer, Kane, Sullivan and Kurucz

[57] ABSTRACT

The alcohol content of an original wine is reduced to produce a low calorie wine having the character of the original wine by evaporating alcohol from the wine in a centrifugal film evaporator. In the evaporator, a thin film of wine is formed by centrifugation and alcohol is evaporated under vacuum and at an elevated temperature. The evaporated alcohol is recovered as a high proof by-product.

16 Claims, 4 Drawing Figures

PREPARATION OF WINE HAVING A LOW CALORIE CONTENT AND A REDUCED ALCOHOL CONTENT

BACKGROUND OF THE INVENTION

There is an ever increasing and growing consumer interest in light and low calorie foods and beverages. The growth in light beverages in the past five years has been phenomenal: consumption of light beers are up 350% and low calorie soft drinks are up 58%. In each case, the "light" beverage has far outstripped the growth rate of its "regular" counterpart. In keeping with this interest, the wine industry has recently introduced several low calorie wines.

Low calorie wine has been made by harvesting grapes before muturity when the suger content is less than that required for ordinary grapes. With less sugar, there is less alcohol and consequently, fewer calories. In this process, the grapes must be made into wine very quickly to preserve flavor.

SUMMARY OF THE INVENTION

A principal object of the invention is to provide a light wine that responds to consumer need which is not filled by any other wine now sold in the United States or abroad, namely, a white wine with substantially fewer calories then typical table wines, and also which has an appealing taste.

Another object is the provision for a light wine and a process that permits the wine to be produced year-round, thereby providing an extraordinary advantage. Whereas the prior art light wines are limited to the amount of "light" wine which they decide to produce during the harvest, and, in addition, as a result of the method employed, the resulting wine, in most instances, has not met quality standards and has failed in consumer taste tests.

A further object is to provide a light wine that has a fine fruity flavor which compares favorably to regular chablis, roses, reds and other white wines while being slightly drier than the regular chablis as well as the respective other wines mentioned in the above.

Still another principal object of this invention is to utilize the finished wine and convert it into a reduced alcohol and low calorie wine as compared to the prior art methods that do not originate from a finished wine or utilize sound ripe grapes.

A still further object of the present invention is to remove alcohol and some volatile components in wine without loss of character of the original wine to thereby produce an exceptional and acceptable low calorie wine at reduced alcohol levels.

As another important object of the present invention, the new light wine of the present invention differs from prior art low calorie wines in two important ways. It has achieved significant predetermined quantitative reduction of calories, and the wine is made from fully matured grapes, giving it a flavor which compares very favorably to the original regular wine.

Yet another principal object of this invention is to obtain a light chablis, with an alcohol content of about 7.1% compared to 10–12% for regular white wine and 8.5%–9.5% for recently introduced prior art reduced calorie wines; and a light chablis is produced having 33% fewer calories then regular white wine compared to only 25% fewer calories of the prior art light wines. Towards this end, the present invention contemplates the production of other light wines of comparable reduced alcohol and calorie levels.

DETAILED DESCRIPTION

Figure 1:
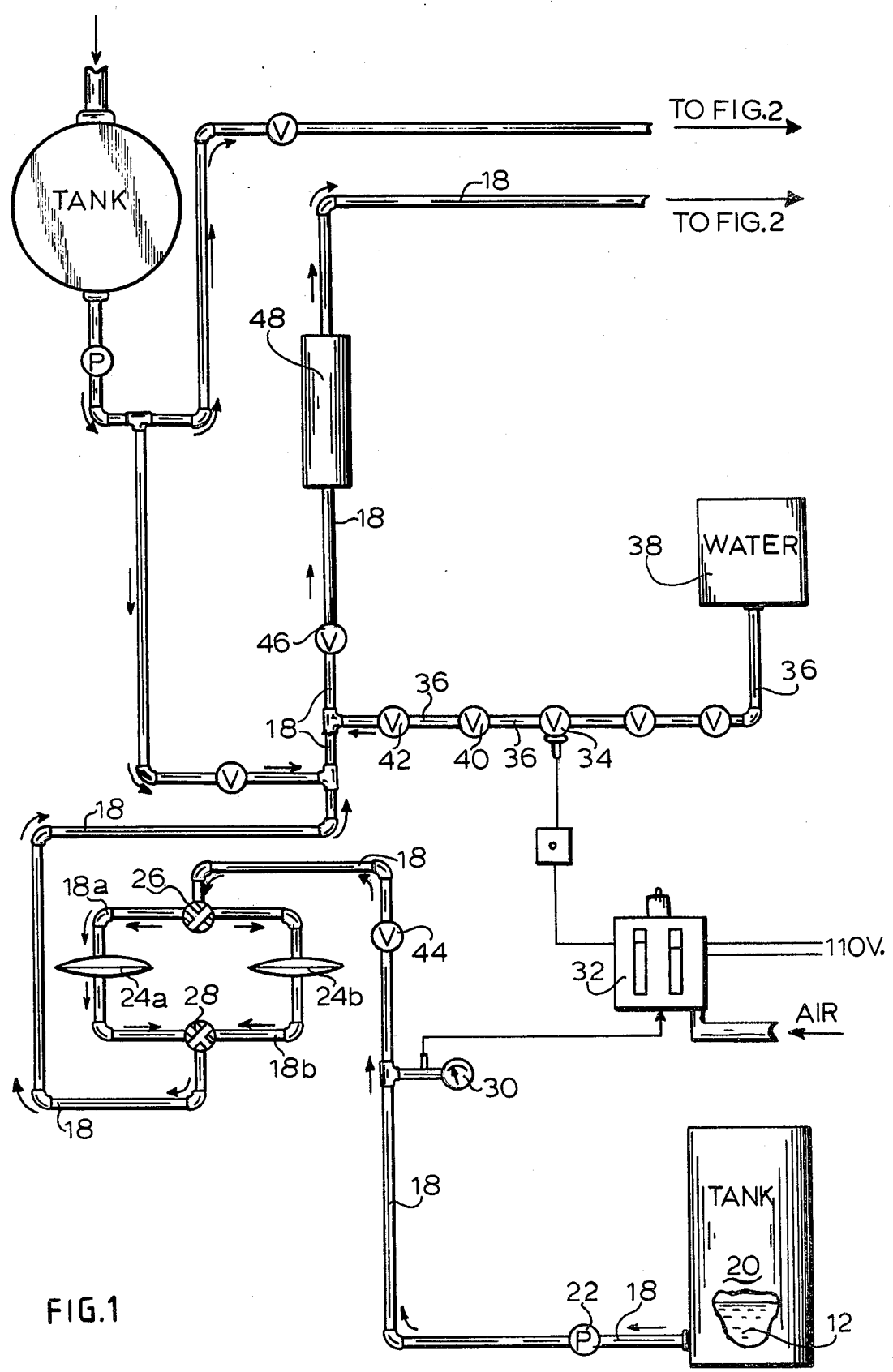
FIGS. 1–3 when placed side-by-side schematically illustrate the system for reducing the alcohol content of original wine.
Figure 2:
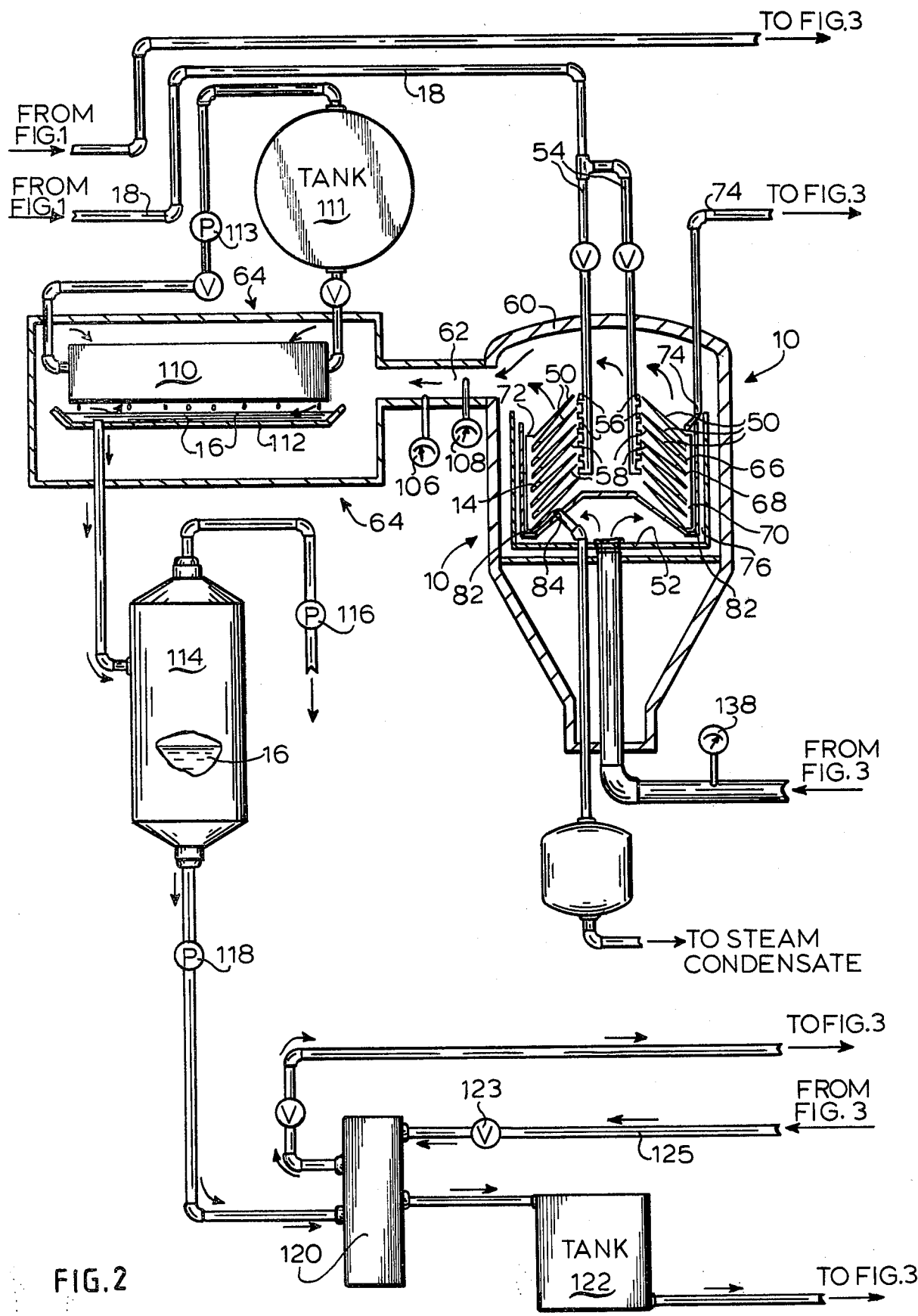
Figure 3:
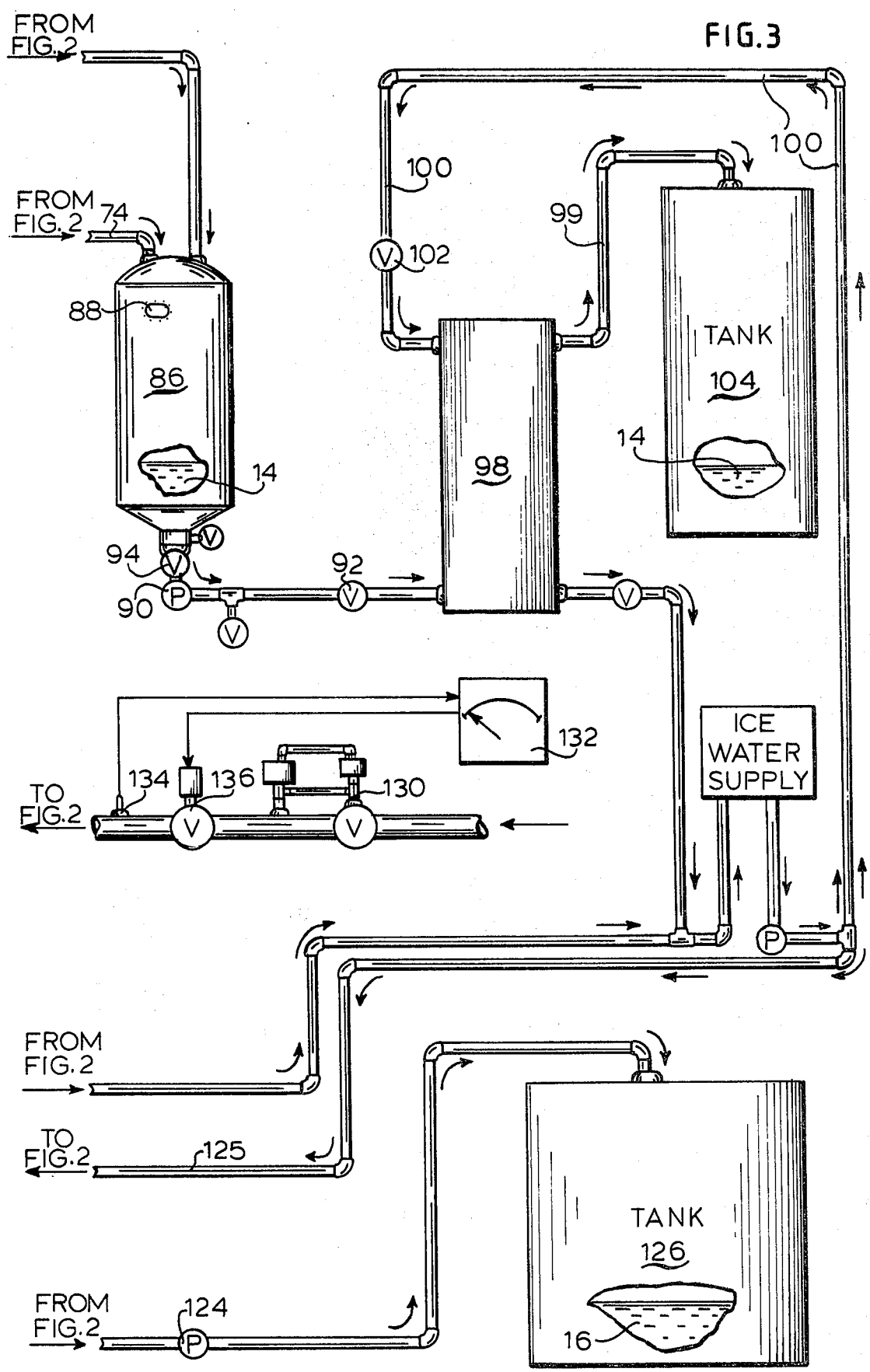
Figure 4:
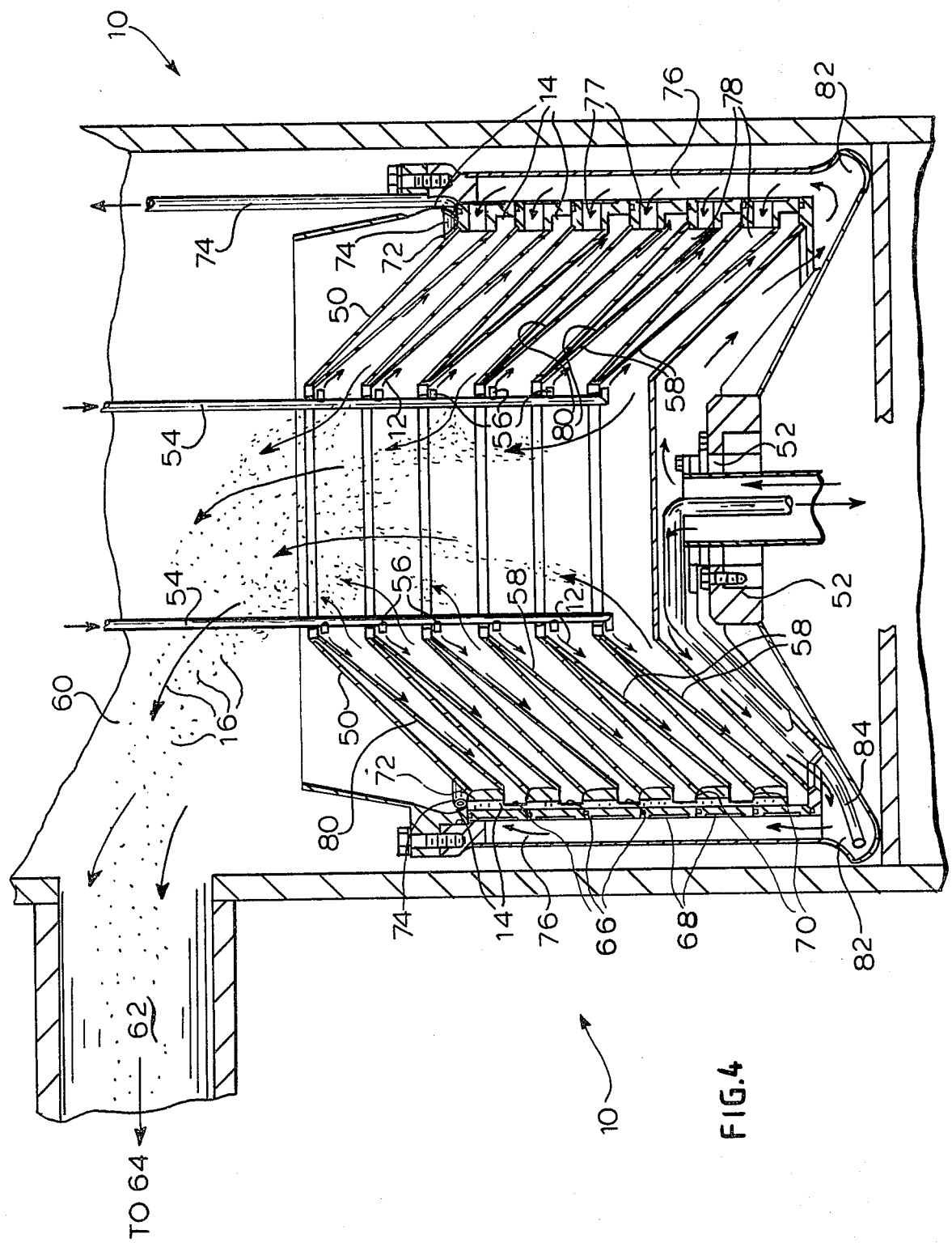
FIG. 4 is an enlarged fragmentary sectional view of the centrifugal film evaporator forming part of the present invention.

Reference is now made to FIGS. 1, 2 and 3 wherein the system and process of the invention for producing low calorie wine at reduced alcohol content is diagramatically illustrated (these figures are to be placed side-by-side as indicated). In these figures, a centrifugal film evaporator 10 advantageously cooperates in reducing an original wine product 12 into a liquid phase which is a reduced alcohol wine 14 achieving the objective of this invention and a vapor phase which is a high proof vapor by product 16. For purposes of explanation of the present invention and for exemplary purposes, the original wine product 12 will be a chablis at 10.8% alcohol, the reduced alcohol wine 14 will be a light chablis at 7.1% alcohol and the vapor by-product 16 will be high proof at 45% alcohol. The specific parameters of the several components of the system that are illustrated and described below are taken from a successful embodiment and application of this invention more fully described in the following Examples. It should be understood, however, that other wines and parameters are envisioned and fall within the scope of the present invention.

The original feed wine inlet 18 connects with an original line wine tank 20 which may be of 50,000 gallon capacity and a feed pump 22. The feed line 18 includes two screen filters 24a and 24b in bifurcated lines 18a and 18b, respectively. Three-way valves 26 and 28 permits one of the lines 18a or 18b to be closed so that it can be cleaned. A gauge 30 indicates the pressure of the wine going through the feed line 18. A control device 32 is coupled with valve 34, which when actuated is adapted to cut off pump 22, and, consequently, the feed of wine 12.

The solenoid valve 34 is in a water supply line 36 connected with a source of supply 38 of water. Water is introduced into the system and particularly line 18 to prevent wine from depositing and solidifying on the internal parts of the evaporator 10 when the original wine feed is stopped. Otherwise, the entire system must be stopped in order to clean the interior of the evaporator 10. Valve 40 adjusts the rate of feed of water and check valve 42 prevents wine in line 18 from entering line 36. Similarly, check valve 44 prevents water from mixing with the wine beyond this location in wine line 18. A manual control valve 46 controls the rate of feed of wine in line 18, the rate of feed being indicated by a rotometer 48 which in the successful embodiment of the Examples, infra., indicated a flow of 980 gallons an hour. The wine from the rotometer 48 is directed into the evaporator 10.

The evaporator 10 may be obtained commercially from Alfa-Laval AB, Lund, Sweden. The evaporator 10 contemplates by the present invention utilizes indirect heat exchange with thin-layer liquid flow and centrifugal separation. The heating surfaces consist of a nesting stack of hollow conical discs 50 rotating on a motor driven common spindle 52. The heat is provided by steam fed internally of the discs in a manner to be described shortly.

The original or starting wine enters through the stationary distributor pipe 54 in the opened central column and is sprayed through nozzles 56 onto the underside 58 of the rotating conical discs 50, where centrifugal forces immediately spreads it over this entire surface. In the successful embodiment of the Examples, Infra., this layer was no more than 0.1 mm (0.004 inches) thick, while the conical discs 50 were rotated at about 800 rpm and the nozzle discharge opening was 5 mm. Transit time from inner to outer edges was approximately 1 second. Contact with the steam heated surface results in instant vapor formation of the lower boiling point and lower heat of vaporization compounds; the vapor escapes easily from the thin liquid layer and rises through the open central column of the evaporator 10 into the surrounding shell 60 from which it is drawn off through the outlet 62 to the condenser 64, which converts the vapor phase into the high proof by product 16.

The low alcohol wine 14 collects against inner wall 66 of the rims 68 of the conical discs 50. The wine travels up vertical openings 70 leading to a paring channel 72 at the top, where the light wine is ducted off by a stationary paring tube 74.

Steam is admitted through the hollow spindle 52 through the jacket 76 surrounding the stack of conical discs 50 and vents through the holes 77 to the disc interior 78, where it is condensed by the wine passing on the underside 58. As soon as the condensate droplets form, they are flung by centrifugal force to the upper inside surface 80 of the conical discs 50 and travel down this surface, escaping back into the steam jacket 76 through the same holes 77 by which the primary steam entered. The condensate runs down the walls of the steam jacket 76 to the paring channel 82 at the bottom, from which it is removed by a stationary paring tube 84 mounted inside the hollow spindle 52. In order to prevent wine deposit on the upper cone face from solidifying by dehydration, this face is insulated from the heat of steam condensate. In the commercial form of evaporator 10, the upper wall of cone 50 is a double separated wall providing insulation to the upper cone surface.

The paring tube 74 directs the liquid phase and specifically the reduced alcohol wine 14 into the receiver 86. In the successful embodiment, the alcohol content of this wine was reduced to 7.1% at a temperature of 90° to 110° when introduced into the receiver 86. The receiver may be provided with sight ports 88 to visually monitor the liquid level in the receiver 86. Receiver 86 is maintained at greater vacuum by pump 90. A pump 90 has to pull a vacuum in order to permit the reduced alcohol wine 14 to leave the evaporator 10 through the paring tube 74 into the receiver 86. As should be apparent shortly, the pump 90 should pull a vacuum equal to or more than the main source of vacuum for the condenser 64 and functions to eliminate any oxidation downstream thereof.

In this connection, liquid level may be changed by altering the drive of the variable speed pump 90 which according to the successful embodiment was a Waukesha pump. A check valve 92 is on the upstream side of pump 90 to avoid vacuum loss, while manual on/off valve 94 may be on the downstream side. Two taps may be conveniently located as indicated. The liquid phase is then passed through a cooler 98 where the temperature is reduced immediately to 38° to 40° F. from 98° to 110° F. The successful embodiment of the following examples employs a plate cooler supplied by ice water at 35° F. through line 100 having an on/off valve 102. This is necessary to retain all the original bouquet, essences and delicate volatile constituents present in the original wine. From the cooler 98, the reduced alcohol wine 14 is pumped through line 99 to a 50,000 gallon insulated refrigerated tank 104 for storage purposes. Storage of the product is at a lower temperature than that conventionally in practice is wineries. The wine remains stored at this temperature in insulated refrigerated tanks 104 prior to bottling.

Referring now to the vapor phase system, the outlet 62 leading to the condensator 64 includes a pressure gauge 106 and a steam temperature gauge 108. The vapor phase from the evaporator 10 is cooled by the condenser 64, which may contain a plate cooler 110 and a collecting pan 112 for the condensed liquid. Cooler 110 may be of the plate variety receiving cooled water from the tank 111 supplied by pump 113. The high proof vapor by-product 16 is drawn into separator 114 at about 98° to 110° F. in the specific embodiment of the following examples by main vacuum pump 116 discussed in the above. Pump 118 feeds the high proof by-product 16 to cooler 120 which may be of the plate variety. In the successful embodiment of the examples, infra., the high proof product emerging from cooler 120 is at 38° F. and was initially stored in a 4,000 gallon receiver 122 and then transferred by pump 124 to a larger 50,000 gallon receiving tank 126. The cooler 120 receives ice water through line 125 having valve 123 which may be pumped by pump 128 which may also supply coolant for line 100.

Reference is now made to the steam supply system for the evaporator 10. In the discussed embodiment, steam at 100 lbs. pressure, as an example, passes through pressure reducer 130 by which the steam is reduced to 50 lbs. per square inch. A control device 132 for the steam supply system monitors the pressure in the steam line through the coupled sensor 134. If the pressure exceeds a predetermined limit or should there be a failure in the steam supply system a solenoid valve 136 cuts off the system. A gauge 138 may be deployed for indicating steam temperature which was about 140° F. in the successful embodiment described in the following example.

Operation of the process of this invention is at very high vacuum conditions,, normally 27 inches HG to 29 inches HG vacuum. The timing contact of the feed wine 12 with the heat transfer surface 58 is less than 1 second; and, therefore, in effect, no molecular decomposition or transformation takes place due to chemical reaction.

Those skilled in the art readily appreciate that wine is a highly complex mixture of ingredients, the blend of which account for its unique taste or flavor characteristics. The major proportion of wine is of course made up of water and ethyl alcohol. In addition, one generally expects to find organic and inorganic compounds such as Sugars like glucose, fructose, pentoses;
Alcohols such as glycerol, 2,3-butanediol, acetoin, amyl, isobutyle and n-propyl alcohols;
Esters such as ethyl acetate, ethyl succinate, ethyl lactate;
Acids such as tartaric, malic, citric, succinic, lactic and acetic acids;

Minerals such as sodium, potassium, calcium, iron phosphorus, sulfur and copper;
Nitrogenous substances such as ammonia, amino acids and proteins;
Acetaldehyde;
Phenolic substances;
Color pigments and
Vitamins in a minor proportion. Many of these organic and inorganic compounds, alone or in combination, give characteristic taste and flavor to the wine.

It is expected that some of the more volatile of these flavoring compounds making up the minor proportion of wine will be removed during the process of the invention. This is particularly true of its higher alcohols such as the aliphatic alcohols of 3 to 5 carbon atoms, inclusive. It is noteworthy, however, that the loss of these volatile compounds does not adversely affect the desired taste characteristics of the wine. In fact, removal of amyl alcohol is thought to be beneficial to the taste of the product wine. In the wines of the invention, which generally contain from about 7.0 to about 7.2 percent by volume of ethyl alcohol, there will be present higher alcohols in the following approximate proportions:

|  | gms/100 l |
| --- | --- |
| n-propyl alcohol | 1.5–2.5 |
| isolutyl alcohol | 0.0–1.5 |
| amyl alcohol | 4.5–6.5 |

These proportions represent approximately a 50 percent reduction over the original wines from which the wines of the invention are produced. This reduction, particularly of the amyl alcohol is a significant physical characteristic of the wine of the invention.

The following examples describe the manner and process of making and using the invention and set forth the best mode contemplated by the inventors of carrying out the invention but are not to be construed as limiting. In carrying out the examples the chemical analysis results reported were determined by gas chromatograph.

EXAMPLE 1

Employing the apparatus described above and depicted in the FIGS. 1-4, inclusive, a California white dinner wine (chablis) is treated according to the above described method of the invention. Chemical analysis of the original wine and of the wine of the invention produced by the method of the invention is given in the Table 1, below.

TABLE 1

|  | Original Wine | Reduced Calorie Wine |
| --- | --- | --- |
| Alcohol (% by volume) | 10.8 | 7.1 |
| n-propyl alcohol (gms/100 l) | 4 | 2 |
| isobutyl alcohol (gms/100 l) | 3 | 1 |
| amyl alcohol (gms/100 l) | 14 | 6 |

The low calorie wine of this Example possesses the desirable flavor characteristics of the original wine.

EXAMPLE 2

The procedure of Example 1, supra, is repeated except that the original wine treated is a California rose wine. The vapor by-product is high proof (46.3%) alcohol. The chemical analysis of the original and the product wines are given in Table 2, below.

TABLE 2

|  | Original Wine | Reduced Calorie Wine |
| --- | --- | --- |
| alcohol (% by volume) | 11.7 | 7.0 |
| n-propyl alcohol (gms/100 l) | 4 | 2 |
| isobutyl alcohol (gms/100 l) | 2 | 0 |
| amyl alcohol (gms/100 l) | 13 | 5 |

The low calorie wine of this example possesses the desirable flavor characteristics of the original wine.

For comparative purposes, it should be noted that the low calorie wines of the prior art generally contain a minimum of about 10 gms./100 l of amyl alcohol.

What is claimed is:

1. A continuous method of directly substantially reducing the alcohol content of the entire original wine to produce a low calorie wine having a substantial amount of its original alcohol content comprising:
   feeding an original wine product from a source through an inlet line to a centrifugal film evaporator having an air tight chamber;
   pulling a vacuum in the chamber;
   forming a thin film of the original wine product by centrifugation within the chamber;
   utilizing indirect heat exchange with the thin film while it is subject to centrifugation;
   exposing the thin film for a relatively short period of time to elevated temperatures and the vacuum in the chamber while it is subjected to centrifugation to remove alcohol as a vaporized product from the original wine product leaving a reduced alcohol wine;
   feeding the reduced alcohol wine under the influence of centrifugal force from the evaporator and then into a receiving tank to obtain said low calorie wine;
   passing the vaporized product through a condensor; and
   collecting the vaporized product as a high proof by-product.

2. A continuous method of directly substantially reducing the alcohol content of the entire original wine to produce a low calorie wine having selected characteristics of the original wine comprising:
   feeding an original wine product from a source through an inlet line to a centrifugal film evaporator having an air tight chamber;
   pulling a vacuum in the chamber;
   rotating a plurality of cone-shaped members that are hollow and that are disposed in the chamber;
   introducing steam into the hollow of the members for purposes of elevating the temperature of the outer bottom face of the cone-shaped members;
   feeding the steam condensate within the cone-shaped members outwardly for removal;
   feeding the original wine product through nozzles centrally of the members onto the lower face of the cone-shaped members, the wine product covering the outer lower face of the cone-shaped members as a thin film under the influence of centrifugal force, as it travels over the lower face of the cone-shaped members;

the heat of the outer bottom face of the cone-shaped members and the vacuum in the chamber combine to remove alcohol, as a vaporized product from the original wine product leaving a wine product having its alcohol content substantially reduced;

feeding the reduced alcohol wine beverage under the influence of centrifugal force from the evaporator and then into a receiving tank for producing said low calorie wine;

passing the vaporized product through a condensor; and collecting the vaporized product as a high proof by-product.

3. A continuous method of directly substantially reducing the alcohol content of the entire original wine to produce a low calorie wine having a substantial amount of its original alcohol content comprising:

feeding an original wine product from a source through an inlet line to a centrifugal film evaporator having an airtight chamber;

pulling a vacuum in the chamber;

rotating a plurality of cone-shaped members that are hollow and that are disposed in the chamber;

introducing steam into the hollow of the members for purposes of elevating the temperature of the outer bottom face of the cone-shaped members;

feeding the steam condensate within the cone-shaped members outwardly for removal;

feeding the original wine product through nozzles centrally of the members onto the lower face of the cone-shaped members, the wine product covering the outer lower face of the cone-shaped members as a thin film under the influence of centrifugal force, as it travels over the lower face of the cone-shaped members;

the heat of the outer bottom face of the cone-shaped members and the vacuum in the chamber combine to remove alcohol, as a vaporized product from the original wine product leaving a reduced alcohol wine;

feeding the reduced alcohol wine under the influence of centrifugal force from the evaporator and then into a receiving tank to obtain said low calorie wine;

passing the vaporized product through a condensor; and collecting the vaporized product as a high proof by-product.

4. The method in accordance with claim 3, wherein approximately 10 percent of the original wine product is pulled off as the vapor phase and 90 percent of the original wine product is pulled off as a reduced alcohol wine from the chamber.

5. The method in accordance with claim 3, including the step of indicating the rate of flow of the original wine product through the inlet line from the source to the centrifugal film evaporator.

6. The method in accordance with claim 3, including the step of adjusting the rate of flow of the original wine product through the inlet line from the source to the centrifugal film evaporator.

7. The method in accordance with claim 3, including the step of filtering the original wine product before it is fed into the centrifugal film evaporator.

8. The method in accordance with claim 3, including the step of sensing the pressure of the original wine product being fed to the centrifugal film evaporator, introducing water into the inlet line when the pressure of the original wine product falls below a predetermined level to thereby assure the feeding of adequate amount of liquid into the centrifugal film evaporator.

9. The method in accordance with claim 3, including the step of indicating the pressure of the original wine product being fed through the inlet line.

10. The method in accordance with claim 3, wherein the reduced alcohol wine is fed from the evaporator at a temperature of between 98°–100° F.

11. The method in accordance with claim 10, wherein the reduced alcohol wine is fed continuously from the evaporator to a cooler, cooling the reduced alcohol wine to a temperature of about 38° F. and thereafter feeding the cooled reduced alcohol wine to a receiver.

12. The method in accordance with claim 3, wherein the evaporator reduces the original wine to 7.1% alcohol content.

13. The method in accordance with claim 3, including the step of pumping the vaporized by-product from the condenser to a cooler, cooling the vaporized by-product by the cooler and then feeding the cooled vaporized by-product to a receiver.

14. The method in accordance with claim 13, wherein the vaporized by-product is then cooled at the cooler to 38° F.

15. The method in accordance with claim 14, wherein the condensed vaporized by-product is fed from the condenser prior to cooling at a temperature of approximately 98°–100° F.

16. The method in accordance with claim 3, wherein the vaporized by product is at least 42% alcohol content.

* * * * *